United States Patent
Loganathan et al.

(10) Patent No.: US 9,042,402 B1
(45) Date of Patent: May 26, 2015

(54) METHODS AND APPARATUS FOR CONTROL PROTOCOL VALIDATION OF A SWITCH FABRIC SYSTEM

(75) Inventors: Jaihari V. Loganathan, Sunnyvale, CA (US); Srinivasan Jagannadhan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 585 days.

(21) Appl. No.: 13/104,423

(22) Filed: May 10, 2011

(51) Int. Cl.
*H04L 12/66* (2006.01)
*H04L 12/46* (2006.01)

(52) U.S. Cl.
CPC .................................. *H04L 12/4641* (2013.01)

(58) Field of Classification Search
USPC ................ 370/230–234, 346–350, 419–428, 370/360–388, 463, 537–544; 375/346
See application file for complete search history.

(56) References Cited

U.S. PATENT DOCUMENTS

| | | | |
|---|---|---|---|
| 6,654,923 B1 | 11/2003 | Grenier et al. | |
| 2005/0018612 A1* | 1/2005 | Fitzgerald | 370/248 |
| 2005/0226144 A1* | 10/2005 | Okita | 370/219 |
| 2006/0031522 A1* | 2/2006 | Soulhi et al. | 709/227 |
| 2006/0262728 A1 | 11/2006 | Addeo et al. | |
| 2010/0061394 A1* | 3/2010 | Sindhu et al. | 370/422 |
| 2010/0228842 A1 | 9/2010 | Kompella et al. | |
| 2012/0069842 A1* | 3/2012 | Reddy et al. | 370/388 |

* cited by examiner

*Primary Examiner* — Iqbal Zaidi
(74) *Attorney, Agent, or Firm* — Cooley LLP (57) ABSTRACT

In some embodiments, an apparatus includes a first network control entity within a control plane of a switch fabric system. The first network control entity is configured to receive a first test signal including a test instruction to be implemented within the switch fabric system. The first network control entity is configured to send a second test signal including the test instruction to a second network control entity such that the second network control entity implements the test instruction for a predetermined amount of time.

20 Claims, 5 Drawing Sheets

METHODS AND APPARATUS FOR CONTROL PROTOCOL VALIDATION OF A SWITCH FABRIC SYSTEM

BACKGROUND

Some embodiments described herein relate generally to switch fabric systems, and, in particular, to methods and apparatus for a control protocol of operations, administration and management/maintenance (OAM) validation over a switch fabric system.

Some known switch fabric systems include a static route OAM mechanism that can verify the effective operation of the control plane elements within a switch fabric system. Such a static route OAM mechanism typically defines a static route, injects it into the control protocol, distributes the static route to a number of network control entities (NCE), and furthermore verifies the distribution of the static route information. Such a static route OAM mechanism, however, introduces inadvertent forwarding state into the switch fabric system that can be disruptive to the data communication. Additionally, after such an attempt of the OAM mechanism, the injected static route information is typically removed manually from each network control entity that has implemented it, which can be cumbersome and costly.

Some known switch fabric systems also include OAM mechanisms that can verify the effective operation of the data plane components (e.g., ping, traceroute, etc.). Such OAM mechanisms typically generate data packets and inject them into the switch fabric network, and verify the operation of the data plane elements by checking whether the injected data packets are successfully delivered to the designated destination or not. Because the control plane has a different topology from the data plane, however, such OAM mechanisms are not applicable to verify the effectiveness of control protocol operations. Additionally, problems in the distribution of control plane information are not always detectable in the operation of the data plane.

Accordingly, a need exists for an OAM mechanism that can be used to verify the operational status of the control plane elements for switch fabric systems without introducing undesirable forwarding state changes or requiring manual modifications of the configurations at associated network control entities. Additionally, a need exists for an OAM mechanism that can be used to verify, in the control plane, the distribution of control plane information.

SUMMARY

In some embodiments, an apparatus includes a first network control entity within a control plane of a switch fabric system. The first network control entity is configured to receive a first test signal including a test instruction to be implemented within the switch fabric system. The first network control entity is then configured to send a second test signal including the test instruction to a second network control entity such that the second network control entity implements the test instruction for a predetermined amount of time.

DETAILED DESCRIPTION

In some embodiments, an apparatus includes a network management module (NMM) that manages the distribution of test information to a number of network control entities within a control plane of a switch fabric system. For example, the network management module can be configured to generate a test signal including a test instruction, and send the test signal to a first network control entity. In some embodiments, the first network control entity is not collocated with a data plane of the switch fabric system.

Upon receiving the test signal, the first network control entity can be configured to send the test instruction to one or more designated network control entities within the switch fabric system. In some embodiments, the network control entities that receive the test instruction from the first network control entity can be collocated with the data plane of the switch fabric system. Each designated network control entity that receives the test instruction can implement the test instruction. For example, the first network control entity that receives the test signal from the network management module can implement the test instruction if it is a designated network control entity (i.e., designated to implement the test instruction). In some embodiments, the designated network control entities can implement the test instruction, for example, for a predetermined amount of time, and then withdraw the test instruction. The designated network control entities can use such a test instruction to verify they are in a state to receive and/or distribute control plane information (e.g., routing information), and not for forwarding within the data plane (e.g., a data packet).

In one embodiment, the propagation and implementation of the test instruction can be verified by checking manually each network control entity that is designated to receive and implement the test instruction. In some other embodiments, each designated network control entity can send an acknowledgement signal back to the sender (e.g., a network management module or a network control entity), indicating that the designated network control entity was successful or unsuccessful in implementing the test instruction. In yet other embodiments, a network control entity that receives an acknowledgement signal from another network control entity can forward the acknowledgement signal to the network device (e.g., a network management module or a network control entity) that sends the test signal to the first network control entity.

As used herein, a module can be, for example, any assembly and/or set of operatively-coupled electrical components, and can include, for example, a memory, a processor, electrical traces, optical connectors, software (executing in hardware) and/or the like.

As used herein, a network control entity can be, for example, a process, application, virtual machine, and/or some other software module (executing in hardware) or a hardware module configured to manage one or more ports of an access switch. For example, a network control entity can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with a group of ports, monitor a state and/or status of peripheral processing devices associated with the group of ports, and/or manage and maintain other information associated with the peripheral processing devices and/or ports associated with the group of ports.

As used herein, the singular forms "a," "an" and "the" include plural referents unless the context clearly dictates otherwise. Thus, for example, the term "a switch fabric" is intended to mean a single switch fabric or a combination of switch fabrics.

Figure 1:
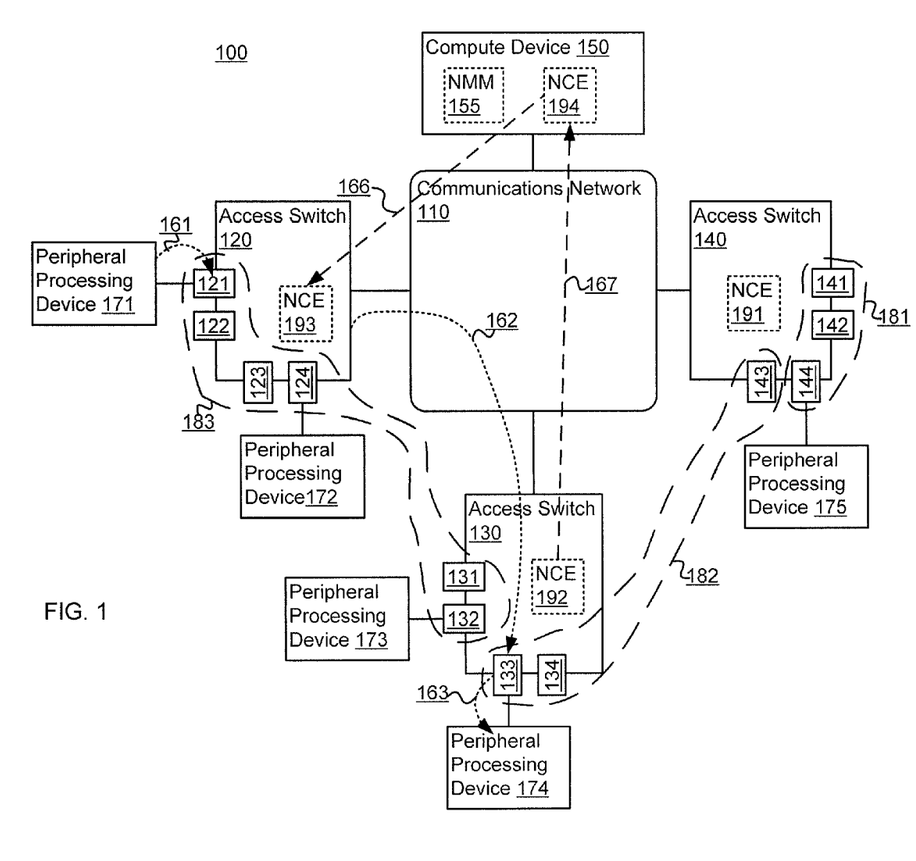
FIG. 1 is a schematic illustration of a switch fabric system, according to an embodiment.

FIG. 1 is a schematic diagram that illustrates a switch fabric system 100, according to an embodiment. The switch fabric system 100 includes a communications network 110, multiple access switches 120, 130, 140, a compute device 150 and multiple peripheral processing devices 171-175. The peripheral processing devices 171-175 are operatively coupled to each other by remaining portions of the switch fabric system 100. The peripheral processing devices 171-175 can be, for example, compute nodes, service nodes, routers, and storage nodes, as described in further detail herein. In some embodiments, for example, the peripheral processing devices 171-175 include servers, storage devices, gateways, workstations, and/or the like.

The peripheral processing devices 171-175 can be operatively coupled to one or more ports 121-124, 131-134, 141-144 of the access switches 120, 130, 140 using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-175 can be operatively coupled to an access switch 120, 130, 140, as described in further detail herein. As such, the peripheral processing devices 171-175 can send data (e.g., data packets, data cells, etc.) to and receive data from the access switches 120, 130, 140. In some embodiments, the connection between the peripheral processing devices 171-175 and the access switches 120, 130, 140 is a direct link. Such a link can be said to be a single physical hop link. In other embodiments, the peripheral processing devices can be operatively coupled to the access switches via intermediate modules. Such a connection can be said to be a multiple physical hop link.

Each access switch 120, 130, 140 can be any device that operatively couples peripheral processing devices 171-175 to the communications network 110. In some embodiments, for example, the access switches 120, 130, 140 can be edge devices, input/output modules, top-of-rack devices and/or the like. Structurally, the access switches 120, 130, 140 can function as both source access switches and destination access switches. Accordingly, the access switches 120, 130, 140 can send data (e.g., a data stream of data packets and/or data cells) to and receive data from the communications network 110, and to and from the connected peripheral processing devices 171-175.

Each of the access switches 120, 130, 140 is operable to communicate with the other access switches 120, 130, 140 via the communications network 110 (e.g., within both a data plane portion and control plane portion). Specifically, the data plane portion of the communications network 110 provides any-to-any connectivity between the access switches 120, 130, 140 at relatively low latency. For example, the data plane portion of the communications network 110 can transmit (e.g., convey) data between access switches 120, 130, 140. In some embodiments, the communications network 110 can have at least hundreds or thousands of ports (e.g., egress ports and/or ingress ports) through which access switches 120, 130, 140 can transmit and/or receive data.

Figure 2:
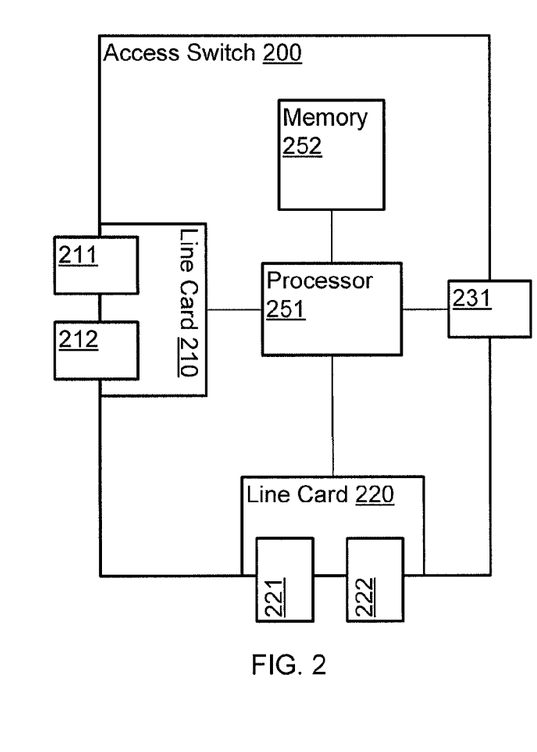
FIG. 2 is a schematic illustration of an access switch of a switch fabric system, according to another embodiment.

FIG. 2 is a system block diagram of an access switch 200 similar to the access switches 120, 130, 140. The access switch 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories.

Similar to the ports 121-124, 131-134, 141-144 of the access switches 120, 130, 140 shown in FIG. 1, ports 211, 212, 221 and 222 can communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow access switch 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, access switch 200 can be in communication with multiple peripheral processing devices using homogeneous or heterogeneous physical layers and/or protocols via ports 211, 212, 221 and 222.

Port 231 can be in communication with other access switches via a communications network such as a switch fabric (e.g., control plane portion of communications network 110). Port 231 can be part of one or more network interfaces (e.g., a 40 Gigabit (Gb) Ethernet interface, a 100 Gb Ethernet interface, etc.) through which the access switch 200 can send signals to and/or receive signals from a communications network. The signals can be sent to and/or received from the communications network via an electrical link, an optical link and/or a wireless link operatively coupled to the access switch 200. In some embodiments, the access switch 200 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can communicate with peripheral processing devices using a protocol based on data packets and port 231 can communicate via a switch fabric using a protocol based on data cells. Said differently, access switch 200 can be an edge device of a network switch such as a distributed network switch.

In some embodiments, the access switch 200 can prepare a data packet (e.g., an Ethernet packet) to enter a communications network (e.g., communications network 110). For example, the access switch 200 can forward, classify, and/or modify the packet encapsulation (e.g., modify, add and/or remove a header portion, footer portion and/or any other identifier included within the data packet) of a data packet prior to sending the data packet to the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some embodiments, the access switch 200 can send a control signal to a communications network (e.g., communications network 110) to distribute to other access switches. The control signal can include protocol information (e.g., forwarding-state information, configuration information, etc.) associated with one or a group of ports of the access switch 200. The access switch 200 can also receive such a control signal sent from other access switches over a communications network.

Returning to FIG. 1, and as described in further detail herein, the access switches 120, 130, 140 can host network control entities 191-193 to manage the ports 121-124, 131-134, 141-144 of the access switches 120, 130, 140. Accordingly, the network control entities 191-193 can be part of a control plane of the switch fabric system 100. Each network control entity 191-193 can be a process, application, virtual machine, and/or some other software module (executing in hardware) or a hardware module executed at an access switch 120, 130, 140 or a compute device 150. As such, instructions that implement the network control entity 191-193 can be stored within a memory of an access switch 120, 130, 140 (e.g., memory 252) and executed at a processor of an access switch 120, 130, 140 (e.g., processor 251).

Each network control entity 191-193 can manage ports 121-124, 131-134, 141-144 of the access switches 120, 130, 140. For example, network control entity 191 is operable to manage the ports 141, 142, 144 associated with the group of ports 181, network control entity 192 is operable to manage the ports 133, 134, 143 associated with the group of ports 182, and network control entity 193 is operable to manage the ports 121, 122, 123, 124, 131, 132 associated with the group of ports 183. In some embodiments, each network control entity 191-193 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its group of ports 181, 182, 183, monitor a state and/or status of peripheral processing devices associated with its group of ports 181, 182, 183, and/or manage and maintain other information associated with the peripheral processing devices and/or ports associated with its group of ports 181, 182, 183, respectively.

In some embodiments, a network control entity can control and/or manage ports at an access switch at which the network control entity is located (e.g., network control entity 191 manages the group of ports 181). In other embodiments, a network control entity can also control and/or manage ports at an access switch other than the access switch at which the network control entity is located (e.g., network control entity 193 manages ports 131 and 132, and network control entity 192 manages port 143). In such embodiments, the network management module 155 has flexibility to assign each port 121-124, 131-134, 141-144 to a network control entity 191-193 based on processing capacity. Additionally, in such embodiments, the network management module 155 is not constrained by the physical location of the network control entities 191-193 and/or the ports 121-124, 131-134, 141-144 when assigning the ports 121-124, 131-134, 141-144 to a network control entity 191-193.

The compute device 150 can host management modules, processes and/or functions associated with the switch fabric system 100. As shown in FIG. 1, the compute device 150 can host a network management module 155 and a network control entity 194. The network control entity 194 can function as a route reflector between the other network control entities 191-193. Similarly stated, the network control entity 194 can function as an intermediary network control entity between the network control entities 191-193 at the access switches 120, 130, 140. The network management module 155 and the network control entity 194 can be part of the control plane of the switch fabric system 100.

Figure 4:
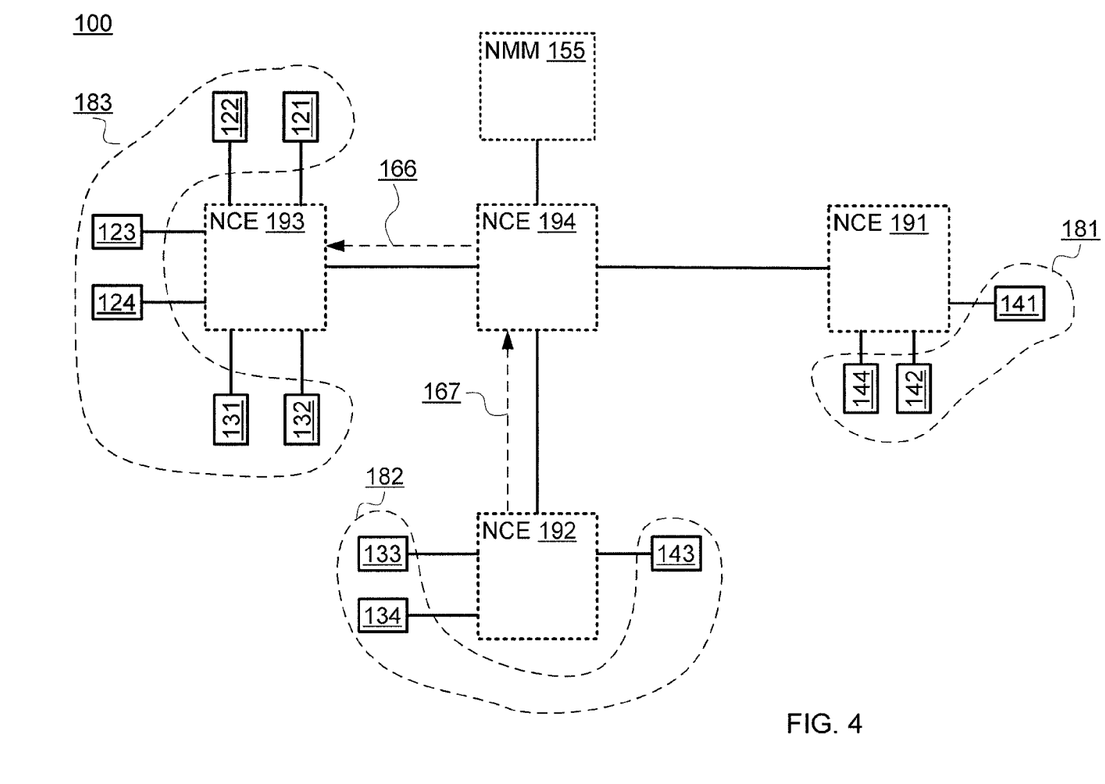
FIG. 4 is a logical representation of a control plane of the switch fabric system of FIG. 1.

FIG. 4, for example, is a block diagram of a logical topology of the control plane of the switch fabric system 100, shown in FIG. 1. As shown in FIG. 4, in the control plane, the network control entities 191-193 are operatively coupled to each other through the network control entity 194. As shown in FIG. 1, and as described in further detail herein, such a connection can be through a control plane portion of the communications network 110.

The network control entities 191-193 can send forwarding-state information (e.g., using a control signal) to each other via the network control entity 194. For example, as described in further detail herein, network control entity 192 can send forwarding-state information associated with the group of ports 182 to the network control entity 193 via the network control entity 194 (e.g., shown as path 167 and path 166). In such an example, the path between the network control entity 192 and the network control entity 193 can be said to include two physical hops as well as two logical hops. Similarly stated, the control plane of the switch fabric system 100 can include multiple logical and physical hops. In some embodiments, the network control entity 194 can be said to be a route reflector (e.g., a Boarder Gateway Protocol (BGP) Route Reflector).

In some embodiments, the network control entities 191-193 can send forwarding-state information to the other network control entities 191-193 over the control plane using a targeted higher level protocol (e.g., an application layer protocol) such as, for example, a Boarder Gateway Protocol (BGP). In such embodiments, a network control entity 191-193 can use such a higher level protocol in conjunction with any suitable lower level protocol (e.g., a data link layer protocol), such as, for example, Ethernet and/or Fibre channel, to send the forwarding-state information. While BGP can be implemented at the application layer, it can be used to send forwarding-state information used to populate a routing table (e.g., stored at the network control entities 191-193) associated with a network layer. Using a targeted protocol, such as BGP, a network control entity 191-193 can send the forwarding-state information to specific network control entities 191-193 while refraining from sending the forwarding-state information to other network control entities 191-193, as described in further detail herein.

In some embodiments, the network control entity 194 can store an address and/or identifier associated with the network control entities 191-193. In such embodiments, when a network control entity 191-193 has updated forwarding-state information to distribute, the network control entity 191-193 can send the updated forwarding-state information to the network control entity 194. The network control entity 194 can then send the forwarding-state information to the other network control entities 191-193 based on the stored address and/or identifier associated with the network control entity 191-193. In other embodiments, the network control entities 191-193 are directly coupled to each other within the control plane without a network control entity 194 acting as a route reflector. In such embodiments, the network control entities 191-193 can store an address and/or identifier associated with the other network control entities 191-193 and send updated forwarding-state information directly to the other network control entities 191-193 via the control plane.

In some embodiments, each network control entity 191-193 can be part of a network segment (e.g., a virtual local area network (VLAN), a virtual switch fabric, etc.). For example, network control entity 192 and network control entity 193 can be part of a first network segment and network control entity 191 can be part of a second network segment. In such embodiments, each network control entity 191-193 only sends forwarding-state information to the other network control entities within the same network segment. Accordingly, the network control entity 194 only sends updated forwarding-state information received from a network control entity 191-193 to the other network control entities 191-193 that are associated with the same network segment as the sender. As such, in the above example, the network control entity 192 sends forwarding-state information to and receives forwarding-state information from the network control entity 193 via the network control entity 194, but not the network control entity 191. Accordingly, the ports 141, 142, 144 associated with the network control entity 191 (associated with the second network segment) do not send data to or receive data from the ports 121-124, 131-134, 143 associated with the network control entities 192 and 193 (associated with the first network segment).

Returning to FIG. 1, the network management module 155 can be a process, application, virtual machine, and/or some other software module (executing in hardware) or a hardware module executed at the compute device 150. The network management module 155 can divide and/or partition the ports 121-124, 131-134, 141-144 of the access switches 120, 130, 140 into the groups of ports 181, 182, 183 to be managed by network control entities 191-193. As such, the network management module 155 can associate the group of ports 181 with the network control entity 191, the group of ports 182 with the network control entity 192 and the group of ports 183 with the network control entity 193. Additionally, as described in further detail herein, the network management module 155 can also monitor an available processing capacity of each network control entity 191-194 and initiate and/or terminate network control entities 191-194 when the available processing capacity of a network control entity 191-194 crosses (e.g., falls below) a first threshold and/or crosses (e.g., exceeds) a second threshold.

In some embodiments, the network management module 155 can store (e.g., in a memory) a configuration file associated with configuration information (e.g., port protocol information, network segment assignment information, port assignment information, peripheral processing device information, etc.) and/or forwarding-state information (e.g., routing information, port identifiers, network segment identifiers, peripheral processing device identifiers, etc.) associated with the switch fabric system 100. As described in further detail herein, the network management module 155 can send a portion of the routing information associated with a respective group of ports 181, 182, 183 to the related network control entities 191-193 via the control plane portion of the communications network 110. Similarly, the network management module 155 can send a portion of the routing information associated with each network control entity 191-193 to the network control entity 194. For example, the network management module 155 can send a portion of the configuration file associated with the group of ports 181 to the network control entity 191. For another example, the network management module can send a portion of the configuration file associated with the network control entities 191-193 to the network control entity 194.

Figure 3:
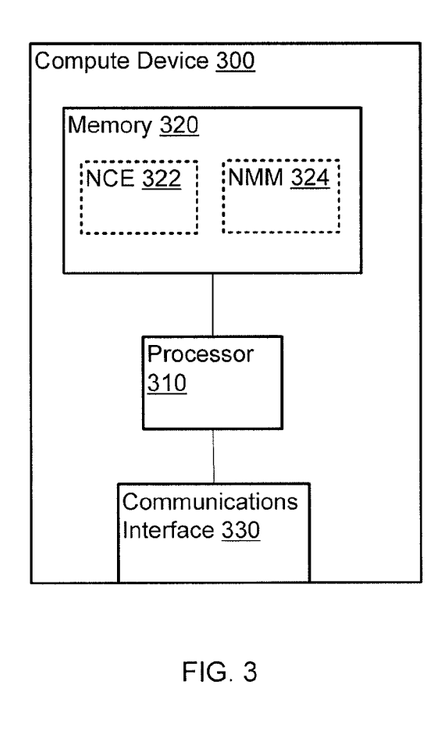
FIG. 3 is a schematic illustration of a compute device of a switch fabric system, according to another embodiment.

FIG. 3 is a system block diagram of a compute device 300 substantially similar to the compute device 150, according to an embodiment. Compute device 300 includes processor 310, memory 320, and communications interface 330. Processor 310 is operatively coupled to memory 320 and communications interface 330. Compute device 300 can communicate with other compute devices, peripheral processing devices and/or access switches via communications interface 330.

As illustrated in FIG. 3, compute device 300 can host a network control entity 322 and a network management module 324 similar to the network control entity 194 and the network management module 155, respectively, of FIG. 1. In other words, network control entity 322 and network management module 324 can be processes, applications, virtual machines, and/or some other software module (executing in hardware) or a hardware module that is executed at compute device 300. In some embodiments, for example, instructions that implement network control entity 322 and/or network management module 324 can be stored at memory 320 and executed at processor 310.

In some embodiments, compute device 300 can be dedicated to hosting network control entity 322 and/or network management module 324. In other words, compute device 300 can allocate all or substantially all of its computing resources (e.g., processing capacity and memory) to network control entity 322 and/or network management module 324. In some embodiments, compute device 300 can host other processes, applications, virtual machines, and/or software modules in addition to network control entity 322 and/or network management module 324. For example compute device 300 can be a general purpose compute device or compute node that hosts multiple processes, applications, virtual machines, and/or software modules.

Returning to FIG. 1, the communications network 110 can be any suitable communications network that operatively couples the access switches 120, 130, 140 to the other access switches 120, 130, 140. Additionally, the communications network 110 can operatively couple the compute device 150 to the access switches 120, 130, 140. In some embodiments, the communications network 110 includes a data plane portion and a control plane portion. The control plane portion of the communications network 110 facilitates transmission of control signals (e.g., configuration information, forwarding-state information, etc.) between the network control entities 191-194 and the network management module 155. Accordingly, the network control entities 191-194 can send configuration information and/or forwarding-state information to other network control entities 191-194 via the control plane portion of the communications network 110. In some embodiments, the control plane portion of the communications network 110 includes direct links between the network control entity 194 and the network control entities 191-193. In other embodiments, the control plane portion of the communications network 110 can include intermediate modules and/or switches to operatively couple the network control entities 191-193 with the network control entity 194.

The data plane portion of the communications network 110 facilitates transmission of data between access switches 120, 130, 140. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can operate as a single logical entity (e.g., a single logical network element). Similarly stated, the data plane portion of the communications network 110 can be part of a single logical hop between a first access switch 120, 130, 140 and a second access switch 120, 130, 140 (e.g., along with the data paths between the access switches 120, 130, 140 and the communications network 110). The data plane portion of the communications network 110 can couple (e.g., indirectly connect, facilitate communication between) the peripheral processing devices 171-175. In some embodiments, the communications network 110 can communicate via interface devices (not shown) operable to transmit data at a rate of at least 10 Gb/s. In some embodiments, the communications network 110 can communicate via interface devices (e.g., Fibre-Channel interface devices) operable to transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, the network management module 155, initiates network control entities 191-193 (by sending a signal to the access switches 120, 130, 140 via the control plane portion of the communications network 110, respectively) and, based on a processing capacity of the network control entities 191-193, assigns each port 121-124, 131-134, 141-144 to a network control entity 191-193. As shown in FIG. 1, for example, the network management module 155 associates ports 121-124, 131 and 132 (group of ports 183) with the network control entity 193; ports 133, 134 and 143 (group of ports 182) with the network control entity 192; and ports 141, 142 and 144 (group of ports 183) with the network control entity 191.

The network management module 155 can also initiate one or more intermediary network control entities and/or route reflectors by sending a signal to an access switch 120, 130, 140 and/or a computing device 150 via the control plane portion of the communications network 110. For example, the network management module 155 can initiate network control entity 194 by sending a signal to the computing device 150 via the control plane portion of the communications network 110. As shown and described above with respect to FIG. 4, each network control entity 191-193 can send control signals (i.e., signals within the control plane) to and receive control signals from the other network control entities 191-193 through network control entity 194. Additionally, as described in further detail herein, each network control entity 191-193 can store less forwarding-state information and/or routing information because the network control entity 194 can store some forwarding-state information and/or routing information in lieu of network control entities 191-193 maintaining all forwarding-state information and/or routing information. For example, each network control entity 191-193 does not store an address and/or identifier associated with the other network control entities 191-193 because the network control entity 194 stores such addresses and/or identifiers. As such, the network control entities 191-193 only store an address and/or identifier associated with the network control entity 194.

The network management module 155 can send configuration information and/or forwarding-state information (e.g., a configuration file) to each network control entity 191-194. In some embodiments, for example, each network control entity 191-193 can receive configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its associated group of ports 181-183 from the network management module 155. For example, network control entity 191 can receive configuration information and/or forwarding-state information associated with the group of ports 181, network control entity 192 can receive configuration information and/or forwarding-state information associated with the group of ports 182 and network control entity 193 can receive configuration information and/or forwarding-state information associated with the group of ports 183. The network control entity 194 can receive configuration information and/or forwarding-state information associated with the network control entities 191-193. As such, the network control entity 194 can act as an intermediary and/or a route reflector (e.g., a BGP Route Reflector) between the network control entities 191-193.

Each network control entity 191-193 can send initial and/or updated forwarding-state information to the other network control entities 191-193 when the forwarding-state associated with its group of ports 181-183 is initiated, changed and/or modified. For example, in response to the peripheral processing device 174 being initially coupled to the port 133, the network control entity 192 can send forwarding-state information associated with the port 133 and the destination peripheral processing device 174 to the network control entity 193. In other embodiments, the network control entity 192 can also send the forwarding-state information to the network control entity 191.

As shown in FIGS. 1 and 4, the network control entity 192 sends the forwarding-state information to the network control entity 194 via the path 167. Specifically, the network control entity 192 retrieves an identifier and/or address associated with the network control entity 194 (e.g., stored in a memory of the access switch 130) and sends the forwarding-state information accordingly. The network control entity 194 can then send the forwarding-state-information to the network control entity 193. Specifically, the network control entity 194 determines that the forwarding-state information should be sent to the network control entity 193 (e.g., the network control entity 193 is part of a same network segment as the network control entity 192), retrieves an identifier and/or address associated with the network control entity 193 (e.g., stored in a memory of the compute device 150), and sends the updated forwarding-state information accordingly. Such a path 167, 166 between the network control entity 192 and the network control entity 193 can be said to include multiple physical hops and multiple logical hops. In particular, the path 167, 166 between the network control entity 192 and the network control entity 193 includes two physical hops and two logical hops (e.g., 166, 167) within the control plane of the switch fabric system 100, as shown in FIG. 4.

In some embodiments, the network control entity 193 can store the forwarding-state information received from the network control entity 194 in a memory associated with the network control entity 193. For example, the network control entity 193 can store the forwarding-state information at the memory (e.g., memory 252) of the access switch 120 at which the network control entity 193 is located. Similarly stated, the network control entity 193 can update a configuration and/or forwarding-state table within the memory of the access switch 120 in response to receiving the forwarding-state information. In some embodiments, the forwarding-state information can be stored at a portion of the memory of the access switch 120 allocated and/or partitioned for the network control entity 193.

The network control entity 193 can then send the updated forwarding-state information to the access switches 120, 130 at which ports 121-124, 131, 132 associated with the network control entity 193 are located. In some embodiments, for example, the network control entity 193 can store the forwarding-state information at a portion of the memory (e.g., within a routing table) of the access switch 120 allocated and/or partitioned for data, processes and/or applications associated with the access switch 120. In such embodiments, the memory of the access switch 120 can store the forwarding-state information in a portion of the memory associated with the network control entity 193 as well as in a portion of the memory associated with the remaining entities, processes and/or modules of the access switch 120. In other embodiments, the forwarding-state information is stored within a single location within the memory of the access switch 120 accessible by the applicable processes at the access switch 120 (including the network control entity 193). The network control entity 193 also sends the forwarding-state information to the access switch 130 (ports 131 and 132 at access switch 130 are associated with the network control entity 193). Similar to the access switch 120, the access switch 130 can store the forwarding-state information within a memory (e.g., within a routing table) located at or assessable to the access switch 130.

A data packet (e.g., an Ethernet packet) can be sent between peripheral processing devices 171-175 using remaining portions of the switch fabric system 100. For example, a data packet can be sent from a source peripheral processing device 171 to a destination peripheral processing device 174. The source peripheral processing device 171 can send the data packet to the access switch 120 through port 121 using a first data link layer protocol (e.g., Ethernet, Fibre Channel, etc.). This is shown by path 161 in FIG. 1.

Based on the forwarding-state information received from the network control entity 193, the access switch 120 can prepare the data packet to enter the communications network 110. In some embodiments, for example, the access switch 120 can add and/or append a header (e.g., encapsulate) to the data packet having a destination address of the peripheral processing device 174 and/or the port 133. In some embodiments, the access switch 120 can also divide and/or partition the data packet into multiple data cells to be sent through the data plane portion of the communications network 110 to the access switch 130.

The data packet and/or cells is/are sent to the access switch 130 through the data plane portion of the communications network 110 as illustrated by path 162. The data plane portion of the communications network 110 can route and/or forward the data packet and/or cells based on the destination address of the peripheral processing device 174 and/or the port 133. As such, the data plane portion of the communications network 110 can use a second data link layer protocol, different than the first data link layer protocol (e.g., Ethernet, Fibre Channel, etc.) used to send the data packet from the peripheral processing device 171 to the access switch 120. Accordingly, while the data packet can transverse multiple physical hops when in the communications network 110 (e.g., between stages of the multi-stage switch fabric), the path 162 between the access switch 120 and the access switch 130 can be a single logical hop from the perspective of the first data link layer protocol within the data plane portion of the communications network 110.

The access switch 130 can then prepare the data packet and/or cells to be sent to the peripheral processing device 174 via the port 133 as shown by path 163. Such preparation can include removing the header (e.g., decapsulating the data packet) having the destination address of the peripheral processing device 174 and/or the port 133 from the data packet and/or cells. In some embodiments, such preparation can also include reconstructing and/or reassembling the data packet from the data cells. More generally, the access switch 130 can prepare the data packet to be sent to the peripheral processing device 174 using the first protocol (e.g., Ethernet, Fibre Channel, etc.). After the data packet is ready, the access switch 130 sends the data packet to the peripheral processing device 174 through port 133.

In other embodiments, updated forwarding-state information is sent when requested by a network control entity (e.g., prior to sending data through the communications network 110). For example, the network control entity 193 managing the port 121 associated with the source peripheral processing device 171 can request forwarding-state information from the network control entity 192 managing the port 133 associated with the destination peripheral processing device 174. While not shown in FIG. 1 or FIG. 4, such a request can be sent via the network control entity 194 via connections within the control plane portion of the communications network 110.

In still other embodiments, the network control entity 194 can store forwarding-state information associated with each network control entity 191-193 with which it is associated. Accordingly, in such embodiments, the network control entity 193 sends the request for forwarding-state information to the network control entity 194. In response to the request, the network control entity 194 can send the forwarding-state information to the network control entity 193. In some embodiments, in response to a request, the network control entity 192 and/or the network control entity 194 also sends forwarding-state information associated with the other ports 134 and 143 of the group of ports 182 that the network control entity 192 manages.

Figure 5:
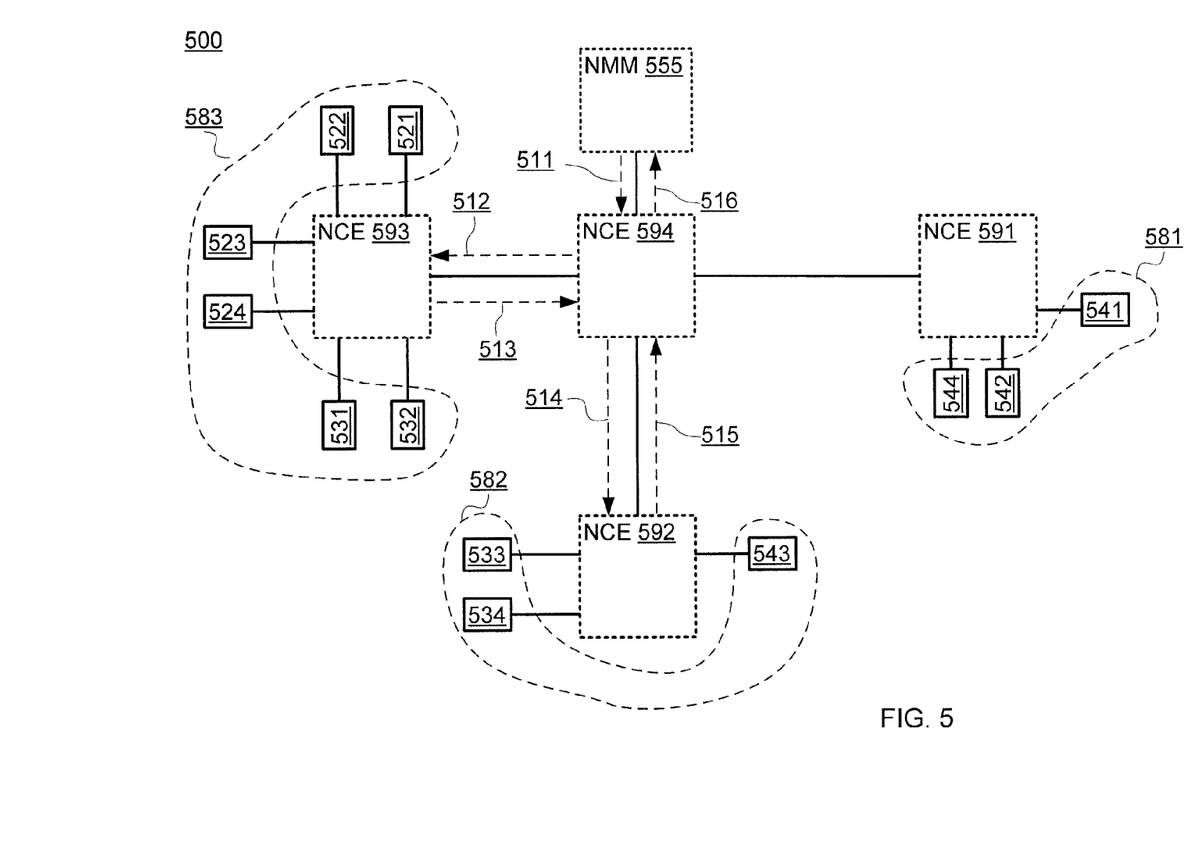
FIG. 5 is a logical representation of a control plane of a switch fabric system, according to another embodiment.

FIG. 5 is a block diagram of a logical topology of the control plane of another switch fabric system 500, that is similar to the switch fabric system 100 shown in FIG. 1. As shown in FIG. 5, the control plane includes a network management module 555 and network control entities 591-594.

Similar to the network management module 155 in FIG. 1 and FIG. 4, the network management module 555 controls the operation of network control entities 591-594 within the control plane of the switch fabric system 500.

The network management module 555 can be collocated with the network control entity 594 on a compute device (not shown in FIG. 5) that is similar to the compute device 150 in FIG. 1. In some embodiments, the compute device that hosts the network management module 555 and the network control entity 594 does not contain any portion of the data plane of the switch fabric system 500 (e.g., a port for transmitting data packets). In other words, the network management module 555 and the network control entity 594 are not collocated with the data plane of the switch fabric system 500.

Each of the network control entities 591-593, however, can be located on an access switch (not shown in FIG. 5) of the switch fabric system. Similar to the access switches 120, 130, 140 in FIG. 1, the access switches that host the network control entities 591-593 can have one or more ports that provide a data communication interface through which a peripheral processing device can be operatively coupled to the access switch and transfer data packets with the access switch. In other words, each of the network control entities 591-593 can be collocated with one or more ports of an access switch that are associated with the data plane of the switch fabric system.

Similar to network control entities 191-194 in FIG. 4, network control entities 591-593 are operatively coupled to each other through the network control entity 594. In other words, the network control entity 594 can act as an intermediary and/or a route reflector (e.g., a BGP Route Reflector) between network control entities 591-593. Such a connection between network control entities 591-593 and the network control entity 594 can be through a control plane portion of a communications network (not shown in FIG. 5) similar to the communications network 110 in FIG. 1, as described in detail herein. Furthermore, the network control entity 594 can also act as an intermediary between the network management module 555 and network control entities 591-593. That is, the network management module 555 can communicate with network control entities 591-593 through the network control entity 594.

Similar to network control entities 191-193 in FIG. 4, each of the network control entities 591-593 can manage a number of ports of one or more than one access switches. For example, as shown in FIG. 5, network control entity 591 is operable to manage the ports 541, 542, 544 associated with the group of ports 581, network control entity 592 is operable to manage the ports 533, 534, 543 associated with the group of ports 582, and network control entity 593 is operable to manage the ports 521, 522, 523, 524, 531, 532 associated with the group of ports 583. The functionalities of network control entities 591-593 with respect to managing the groups of ports 581-583 are the same as that of network control entities 191-193 managing the groups of ports 181-183, as described in detail herein.

An operation of verifying the effectiveness of a control plane can be performed for a switch fabric system. In some embodiments, the operation can be performed by a personnel (e.g., a network administrator) manually. In some other embodiments, the operation can be performed automatically within the control plane of the switch fabric system on a regular basis (e.g., weekly, monthly, etc.). FIG. 5 illustrates such an operation.

As shown in FIG. 5, the network management module 555 can be configured to generate and send a test signal including a test instruction to the network control entity 594 (e.g., shown as path 511). The test instruction can be destined to one or more network control entities that are designated to implement the test instruction. For example, the test instruction can have a destination of the network control entity 594 only. For another example, the test instruction can have a destination of the network control entity 592 and the network control entity 593.

Furthermore, the network management module 555 can also be configured to send an indicator associated with the test instruction to the network control entity 594. The indicator includes information of the network control entities that are designated to implement the test instruction (e.g., "network control entity 594", "network control entity 592, 593", "all network control entities except for network control entity 591", etc.). In some embodiments, the indicator can be sent by using a separate control signal in parallel to the test signal. In some other embodiments, the indicator can be sent by using the same test signal that carries the test instruction. For example, the indicator can be included in the test instruction itself. For another example, the indicator can be encapsulated into the header of the control packet(s) that carry the test instruction.

Upon receiving the test instruction and the indicator, the network control entity 594 first retrieves the information of the designated network control entities based on the indicator. If the network control entity 594 is among the designated network control entities, i.e., it is instructed to implement the test instruction, the network control entity 594 implements the test instruction. If any other network control entity is designated to implement the test instruction, the network control entity 594 can forward the test instruction to each of the other designated network control entities by sending a test signal including the test instruction to each remaining designated network control entity. For example, if the network control entity 592 and the network control entity 593 are among designated network control entities, the network control entity 594 can send a test signal including the test instruction to each of network control entity 592 and 593 (represented by path 512 and path 514 in FIG. 5).

Upon receiving a test instruction, each designated network control entity implements the test instruction accordingly (e.g., update a routing table, change stored configuration information, etc.). For example, as shown in FIG. 5, the network control entity 592 and the network control entity 593 can implement the test instruction that is received from the network control entity 594.

The test instruction can include at least one of various types of instructions. In one embodiment, the test instruction can be an instruction associated with a virtual local area network. For example, network control entity 592 and network control entity 593 can be part of a virtual local area network, which does not include network control entity 591, and the test instruction can be associated with this particular virtual local area network (e.g., an instruction indicating that all members of this particular virtual local area network add a new route to their routing table). As a result, this test instruction is distributed to all the network control entities within this particular virtual local area network (e.g., network control entity 592 and network control entity 593) and is implemented accordingly (e.g., the new route is added to the routing table at network control entity 592 and the routing table at network control entity 593). On the other hand, the test instruction is not sent to network control entity 591 because it is not part of the virtual local area network that includes network control entity 592 and network control entity 593.

In another embodiment, the test instruction can be an instruction associated with multicast distribution of a data packet. For example, the test instruction can cause delivery of any data packet coming from port 541 to port 521, port 522, and port 532. As a result, this test instruction is distributed to all network control entities that manage the routing of data packets from port 541 to port 521, port 522, port 532 (e.g., network control entity 591, 593, and 594), and the routing tables at the corresponding network control entities (e.g., network control entity 591, 593, and 594) are updated accordingly.

In still another embodiment, the test instruction can be an instruction associated with route information. For example, as shown in FIG. 1, the test instruction can be destined to network control entity 193 and the instruction can indicate that data packets destined to the peripheral processing device 174 and/or the port 133 are to be forwarded to access switch 130 (assuming access switch 120 is connected with access switch 130 by one physical hop via the communication network 110). As a result, the test instruction is sent to network control entity 193, and network control entity 193 is configured to update the routing table of access switch 120 by adding the new route.

In some embodiments, because the test instruction is intended to verify the effectiveness of the control plane of the switch fabric system, it is not intended to route any data packet. For example, the test instruction can have a flag that indicates that the test instruction is for the purpose of testing the operation of the control plane. Network control entities that receive such a test instruction can implement it so that the test instruction is not used to route any packet within the data plane.

Furthermore, in some embodiments, a test instruction can be associated with a predetermined interval of time. Specifically, a designated network control entity can be configured to withdraw the test instruction after a predetermined amount of time has elapsed since the network control entity implemented the test instruction.

In some embodiments, upon receiving and implementing a test instruction at a network control entity, the network control entity can send an acknowledgement signal to report whether the implementation of the test instruction was successful or not. For example, as shown in FIG. 5, network control entity 592 can send an acknowledgement signal to network control entity 594 (shown as path 515), indicating that network entity 592 successfully implemented the test instruction. For another example, as shown in FIG. 5, network control entity 593 can send an acknowledgement signal to network control entity 594 (shown as path 513), indicating that network control entity 593 was unsuccessful in implementing the test instruction.

In some embodiments, a designated network control entity that is unsuccessful in implementing a test instruction can be configured not to send an acknowledgement signal to the sender of the test instruction (e.g., a network management module or a network control entity). In other words, the sender of the test instruction does not receive any acknowledgement signal from the designated network control entity if the designated network control entity has not received the test instruction, or has not successfully implemented the test instruction. After a predetermined period of time, the sender of the test instruction can determine that the testing operation has failed. For example, as shown in FIG. 5, network control entity 593 can be configured not to send an acknowledgement signal to network control entity 594 if network control entity 593 is unsuccessful in implementing the test instruction. After a predetermined period of time, network control entity 594 can determine that the corresponding testing operation has failed.

In some embodiments, upon determining a testing operation at a designated network control entity is successful or not (e.g., receiving an acknowledgement signal from the designated network control entity that indicates the implementation was successful or unsuccessful, or not receiving an acknowledgement signal from the designated network control entity for a predetermined period of time), the first network control entity that initially receives the test instruction from the network management module can send an acknowledgement signal to the network management module, indicating whether the implementation of the test instruction at one or more designated network control entities (including the first network control entity or not) is successful or not. For example, as shown in FIG. 5, upon receiving the acknowledgement signals from network control entity 593 and/or network control entity 592, network control entity 594 can send another acknowledgement signal to network management module 555 (shown as path 516), indicating whether the implementation of the test instruction at network control entity 593, and/or network control entity 592, and/or network control entity 594 (i.e., the first network control entity) is successful or not.

In some embodiments, upon determining a testing operation at a designated network control entity is unsuccessful (e.g., because the designated network control entity has not received the test instruction or the designated network control entity was unsuccessful in implementing the test instruction), the first network control entity can be configured not to send an acknowledgement signal to the network management module. Similarly stated, the network management module can determine that the testing operation is unsuccessful if it has not received an acknowledgement signal from the first network control entity for a predetermined period of time. The predetermined period of time associated with a network device (e.g., a network control entity, a network management module) is not necessarily equal to the predetermined period of time associated with another network device (e.g., another network control entity, a network management module). For example, as shown in FIG. 5, network control entity 594 can be configured not to send an acknowledgement signal to network management module 555 if network control entity 594 has not received any acknowledgement signal from network control entity 592 or network control entity 593. Network management module 555 can determine that the testing operation has failed if it has not received any acknowledgement signal from network control entity 594 for a predetermined period of time.

Figure 6:
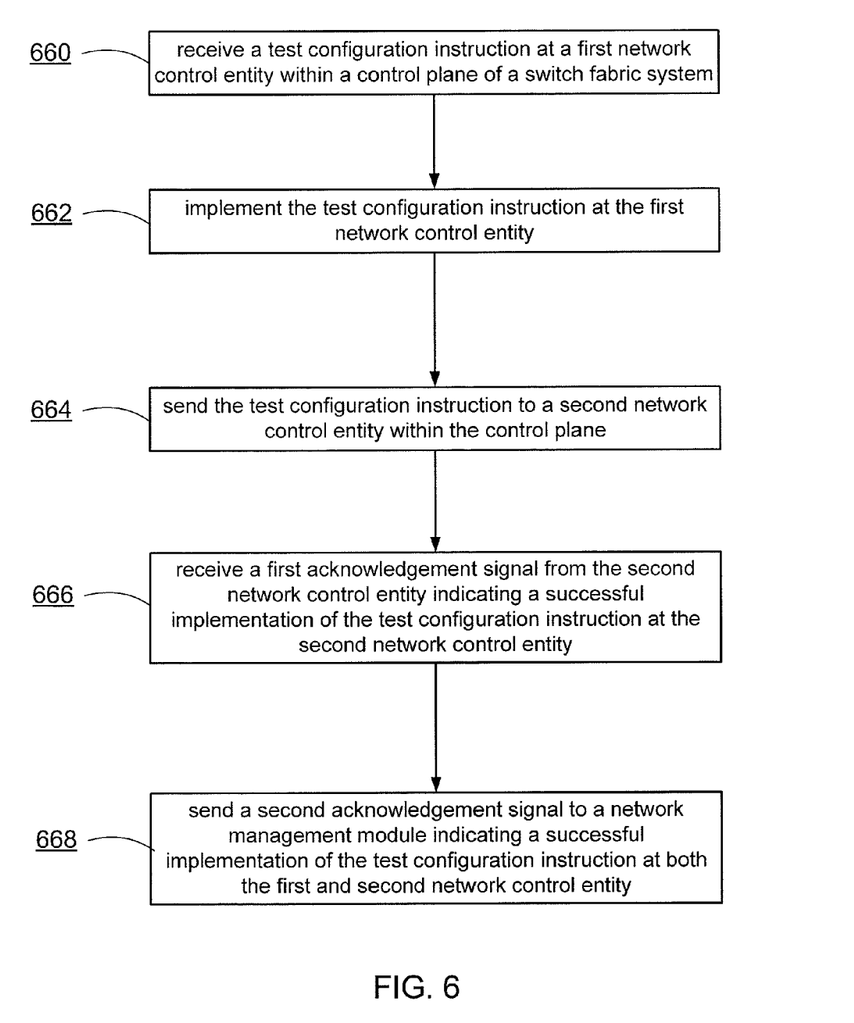
FIG. 6 is a flow chart illustrating a method of verifying the effective operation of the control plane elements within a switch fabric system, according to another embodiment.

FIG. 6 is a flowchart illustrating a method for verifying the effective operation of the control plane elements within a switch fabric system (e.g., switch fabric system 100 in FIG. 1, or switch fabric system 500 in FIG. 5). At 660, a test instruction can be received at a first network control entity within a control plane of a switch fabric system. In some embodiments, the first network control entity can be collocated with a network management module on a compute device that does not contain any portion of the data plane of the switch fabric system (shown, for example, as network management module 155 and network control entity 194 in FIGS. 1 and 4), and the test instruction can be included in a first test signal sent from the network management module (shown as path 511 in FIG. 5). Furthermore, as described in detail herein, the test instruction can be one of various types of instruction, including at least but not limited to, an instruction associated with a virtual local area network, an instruction associated with multicast distribution of a data packet, or an instruction associated with route information.

At 662, the first network control entity can implement the test instruction. For example, network control entity 594 can implement the test instruction received from network management module 555. In some embodiments, as described herein, the test instruction is associated with a predetermined time interval. That is, the first network control entity can withdraw the test instruction a predetermined amount of time after implementing the test instruction.

At 664, the first network control entity can send the test instruction to a second network control entity within the control plane of the switch fabric system. For example, network control entity 594 can send a second test signal including the test instruction to network control entity 592, as shown by path 514 in FIG. 5. In some embodiments, the second network control entity can be collocated with one or more ports of an access switch that are associated with the data plane of the switch fabric system. For example, as shown in FIG. 5, network control entity 592 is collocated with port 533, port 534, and port 543. In some other embodiments, the second network control entity is not collocated with any access switch, but configured to manage a port on an access switch. For example, the second network control entity can be located on a compute device and configured to manage a port of access switch (for example, computer device 150 of FIG. 1 having a network control entity (not shown in FIG. 1) that controls a port (not shown in FIG. 1) of access switch 140 other than ports 141-144).

In some embodiments, the first network control entity can send the second test signal to the second network control entity in response to the second network control entity satisfying a condition associated with the test instruction. In other words, the first network control entity can verify whether the second network control entity satisfies a condition associated with the test instruction or not, and sends the second test signal including the test instruction to the second network control entity when the second network control entity satisfies the condition. In some embodiments, the first network control entity can make the verification by checking the information associated with the second network control entity and/or the condition associated with the test instruction. The information can be stored in a memory that is accessible to the first network control entity. For example, as described herein, the condition associated with the test instruction can be that the second network control entity is part of a particular virtual local area network. As shown in FIG. 3, the first network control entity (e.g., network control entity 322) can check the information of that particular virtual local area network in the memory (e.g., memory 320) of the device (e.g., compute device 300) that hosts the first network control entity to make the verification. In some other embodiments, as an alternative, the first network control entity can communicate with the second control entity to make the verification before determining whether or not to send the second test signal. For example, the condition associated with the test instruction can be that the second network control entity controls a particular data port, and the information about that particular data port is not stored in the memory accessible to the first control entity. In that case, the first network control entity can send a query message to the second network control entity, and act accordingly based on the response from the second network control entity.

Upon receiving the second test signal including the test instruction, the second network control entity can implement the test instruction. In some embodiments, implementing the test instruction at the second network control entity can cause the second network control entity to be configured to update a routing table. For example, as shown in FIG. 5, by implementing the test instruction sent from network control entity 594 (shown as path 514), network control entity 592 can add a new route, delete an existing route, and/or modify an existing route on the routing table of the access switch that hosts network control entity 592. As described herein, in some embodiments, the test instruction can be associated with a predetermined interval. In such embodiments, the routing table at the second network control entity can be updated by the second control entity, as a result of implementing the test instruction at the second control entity, for a predetermined amount of time, and then be changed back to the original configuration after the predetermined amount of time has elapsed. For example, in FIG. 5, network control entity 592 can update the configuration of the corresponding routing table based on the test instruction for a predetermined amount of time, then return back to the original configuration of the corresponding routing table.

At 666, the first network control entity can receive a first acknowledgement signal from the second network control entity, indicating that the second network control entity successfully implemented the test instruction. For example, as shown in FIG. 5, network control entity 592 can send an acknowledgement signal to network control entity 594 (shown as path 515) indicating that network control entity 592 successfully implemented the test instruction.

At 668, the first network control entity can send a second acknowledgement signal to a network management module indicating that the test instruction was successfully implemented at the first network control entity and the second network control entity. For example, as shown in FIG. 5, network control entity 594 can send an acknowledgement signal to network management module 555 (shown as path 516) indicating that the test instruction was successfully implemented at both network control entity 594 and network control entity 592.

In some embodiments, the first network control entity can send a third test signal including the test instruction to a third network control entity within the control plane of the switch fabric system. For example, as shown in FIG. 5, network control entity 594 can send a test signal including the test instruction to network control entity 593 (shown as path 512). Furthermore, as a result of this operation, the first network control entity can receive a third acknowledgement signal from the third network control entity indicating that the third network control entity was successful, or unsuccessful, in implementing the test instruction. For example, as shown in FIG. 5, network control entity 594 can receive an acknowledgement signal from network control entity 593 (shown by path 513) indicating that network control entity 593 was successful or unsuccessful in implementing the test instruction.

While shown and described above with respect to FIG. 5 as network control entity 594 connected with network control entities 591-593 using a one-hop logic link, in other embodiments, network control entity 594 can be connected to a network control entity using a multi-hop logic link. In other words, network control entity 594 can be connected to a network control entity using another network control entity as an intermediary. For example, network control entity 594 can be connected to network control entity 591 using network control entity 592 as an intermediary. In such an example, network control entity 592 can forward the test signal received from network control entity 594 to network control entity 591, and also forward the acknowledgement signal received from network entity 591 to network control entity 594.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software (executing on hardware) to perform computations on relatively heavy network workloads. In some embodiments, the services nodes can perform computations on a per-packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a first network control entity within a control plane of a switch fabric system, the first network control entity configured to receive a first test signal including a test instruction to be implemented within the switch fabric system, the first network control entity not collocated with a module associated with a data plane of the switch fabric system,
the first network control entity configured to send a second test signal including the test instruction to a second network control entity such that the second network control entity can update, based on the test instruction, a routing table at the second network control entity from a first configuration to a second configuration for a predetermined amount of time,
the first network control entity configured to determine, based on an indicator in the test instruction, not to send the test instruction to a third network control entity within the control plane of the switch fabric system.

2. The apparatus of claim 1, wherein the data plane of the switch fabric system has a topology different than a topology of the control plane of the switch fabric system.

3. The apparatus of claim 1, wherein the test instruction includes at least one of an instruction associated with a virtual local area network (VLAN), an instruction associated with multicast distribution of a data packet within the data plane, or an instruction associated with route information of the data plane.

4. The apparatus of claim 1, wherein the first network control entity is configured to receive, from the second network control entity, an acknowledgement signal indicating that the second network control entity successfully implemented the test instruction.

5. A non-transitory processor-readable medium storing code representing instructions to cause a processor to:
    receive, at a first network control entity within a control plane of a switch fabric system, a first test signal including a test instruction to be implemented within the switch fabric system;
    update, based on the test instruction, a routing table at the first network control entity from a first configuration to a second configuration;
    send a second test signal including the test instruction to a second network control entity within the control plane of the switch fabric system without sending the test instruction to a third network control entity within the control plane of the switch fabric system;
    receive a first acknowledgement signal from the second network control entity indicating that the second network control entity successfully implemented the test instruction; and
    send a second acknowledgement signal to a network management module indicating that the test instruction was successfully implemented at the first network control entity and the second network control entity.

6. The non-transitory processor-readable medium of claim 5, further comprising code representing instructions to cause the processor to:
    send a third test signal including the test instruction to a fourth network control entity within the control plane of the switch fabric system; and
    receive a third acknowledgement signal from the fourth network control entity indicating that the fourth network control entity was unsuccessful in implementing the test instruction.

7. The non-transitory processor-readable medium of claim 5, further comprising code representing instructions to cause the processor to:
    withdraw the test instruction at the first network control entity a predetermined amount of time after implementing the test instruction at the first network control entity.

8. The non-transitory processor-readable medium of claim 5, wherein the first network control entity is not collocated with a module associated with a data plane of the switch fabric system, the second network control entity being collocated with a module associated with the data plane of the switch fabric system.

9. The non-transitory processor-readable medium of claim 5, wherein the second network control entity is not collocated with an access switch associated with a data plane of the switch fabric system, the second network control entity configured to manage a port on the access switch.

10. The non-transitory processor-readable medium of claim 5, wherein the test instruction includes at least one of an instruction associated with a virtual local area network (VLAN), an instruction associated with multicast distribution of a data packet, or an instruction associated with route information.

11. The non-transitory processor-readable medium of claim 5, wherein a data plane of the switch fabric system has a topology different than a topology of the control plane of the switch fabric system.

12. The non-transitory processor-readable medium of claim 5, wherein the code representing instructions to cause the processor to send the second test signal is executed in response to the second network control entity satisfying a condition associated with the test instruction.

13. An apparatus, comprising:
    a first network control entity configured to receive a test instruction from a second network control entity in response to the first network control entity satisfying a condition associated with the test instruction, the first network control entity and the second network control entity being associated with a control plane of a switch fabric system, the first network control entity being collocated with a module associated with a data plane of the switch fabric system,
    the first network control entity configured to update a routing table from a first configuration to a second configuration for a predetermined amount of time in response to receiving the test instruction, the first network control entity configured to send an acknowledgement signal to the second network control entity indicating that the first network control entity successfully implemented the test instruction;
    the first network control entity configured to determine, based on the test instruction, not to send the test instruction to a third network control entity.

14. The apparatus of claim 13, wherein the data plane of the switch fabric system has a topology different than a topology of the control plane of the switch fabric system.

15. The apparatus of claim 13, wherein the first network control entity is configured to withdraw the test instruction the predetermined amount of time after implementing the test instruction.

16. The apparatus of claim 13, wherein the test instruction includes at least one of an instruction associated with a virtual local area network (VLAN), an instruction associated with multicast distribution of a data packet, or an instruction associated with route information.

17. The apparatus of claim 1, wherein the first network control entity is configured to determine, based on the indicator in the test instruction, to send the second test signal to the second network control entity.

18. The non-transitory processor-readable medium of claim 5, further comprising code representing instructions to cause the processor to:
    determine, based on the test instruction, not to send the test instruction to the third network control entity.

19. The apparatus of claim 13, wherein the second network control entity is not collocated with a module associated with the data plane of the switch fabric system.

20. The apparatus of claim 13, further comprising the second network control entity,
    the second network control entity configured to determine not to send the test instruction to the third network control entity in response to the third network control entity not satisfying the condition associated with the test instruction, the third network control entity being associated with the control plane of the switch fabric system and collocated with a module associated with the data plane of the switch fabric system.

* * * * *